(12) United States Patent
Kubo et al.

(10) Patent No.: US 12,511,709 B2
(45) Date of Patent: Dec. 30, 2025

(54) INFORMATION PROCESSING DEVICE

(71) Applicant: TOYOTA JIDOSHA KABUSHIKI KAISHA, Toyota (JP)

(72) Inventors: Chikage Kubo, Cyofu (JP); Kaori Yamada, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 69 days.

(21) Appl. No.: 18/479,343

(22) Filed: Oct. 2, 2023

(65) Prior Publication Data
US 2024/0212092 A1   Jun. 27, 2024

(30) Foreign Application Priority Data
Dec. 21, 2022   (JP) ................................ 2022-204493

(51) Int. Cl.
*G06T 3/40*   (2024.01)
(52) U.S. Cl.
CPC ............ *G06T 3/40* (2013.01); *G06T 2200/24* (2013.01)
(58) Field of Classification Search
None
See application file for complete search history.

(56) References Cited

U.S. PATENT DOCUMENTS

| | | | | |
|---|---|---|---|---|
| 2013/0346865 A1* | 12/2013 | Yuan | ...................... | G06F 3/0484 715/720 |
| 2015/0331594 A1* | 11/2015 | Terada | .................. | G06F 3/0488 715/801 |
| 2022/0003565 A1* | 1/2022 | Leong | ................ | G01C 21/3667 |

FOREIGN PATENT DOCUMENTS

| | | |
|---|---|---|
| JP | H10-096642 A | 4/1998 |
| JP | 2010-066207 A | 3/2010 |
| JP | 7044933 B1 | 3/2022 |

* cited by examiner

*Primary Examiner* — Peter Hoang
(74) *Attorney, Agent, or Firm* — SoraIP, Inc.

(57) ABSTRACT

An information processing device capable of displaying a map by any one of a first display arrangement and a second display arrangement in which a display area on a screen of a display device is different. A control unit for executing switching between the first display arrangement and the second display arrangement based on a first operation performed by a user, and changing a scale of the map being displayed based on a second operation performed by the user, wherein the control unit changes a scale in a case where the map is displayed in the first display arrangement when the second operation is performed while the map is being displayed in the first display arrangement, and does not change a scale in a case where the map is displayed in the second display arrangement.

7 Claims, 4 Drawing Sheets

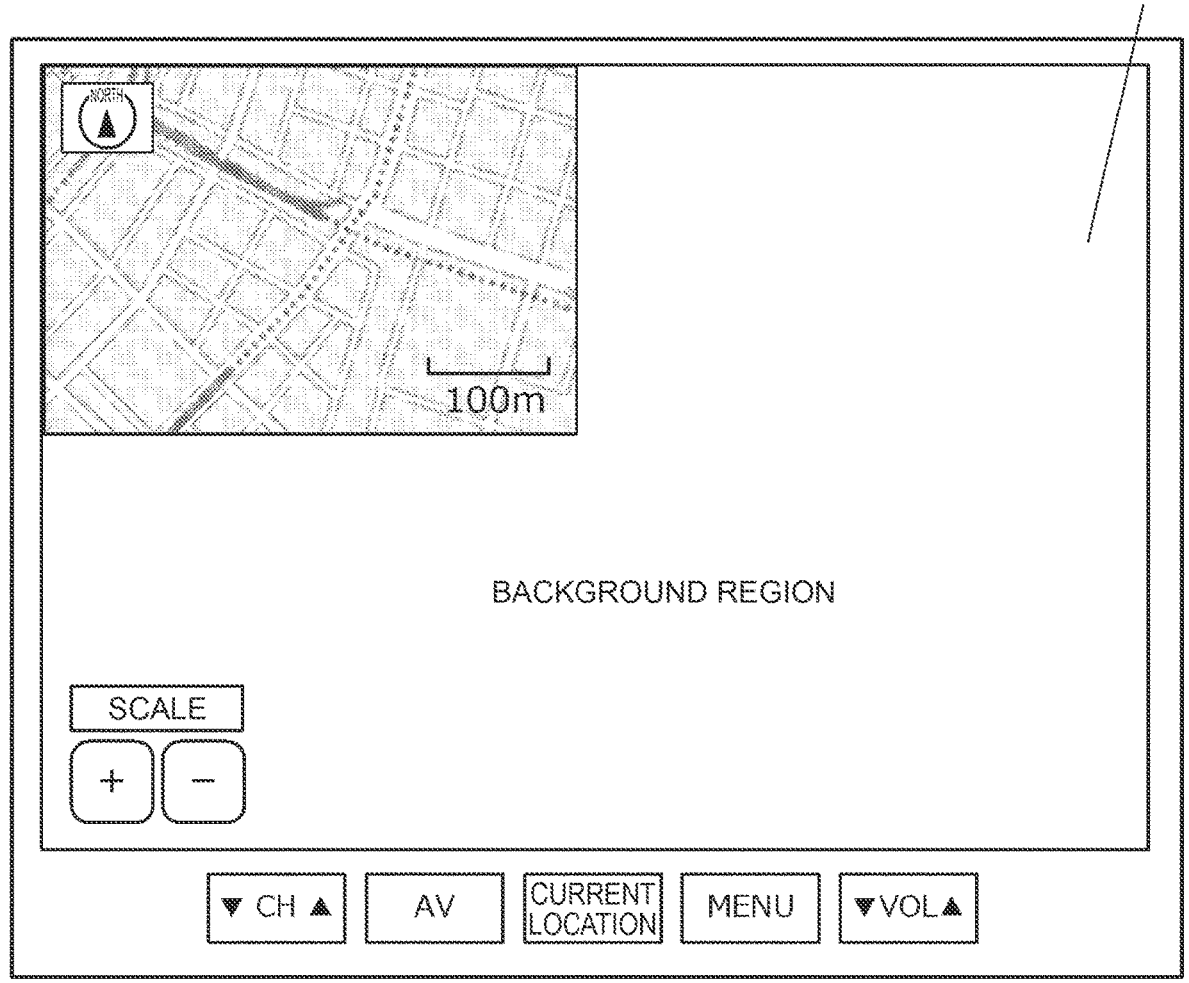

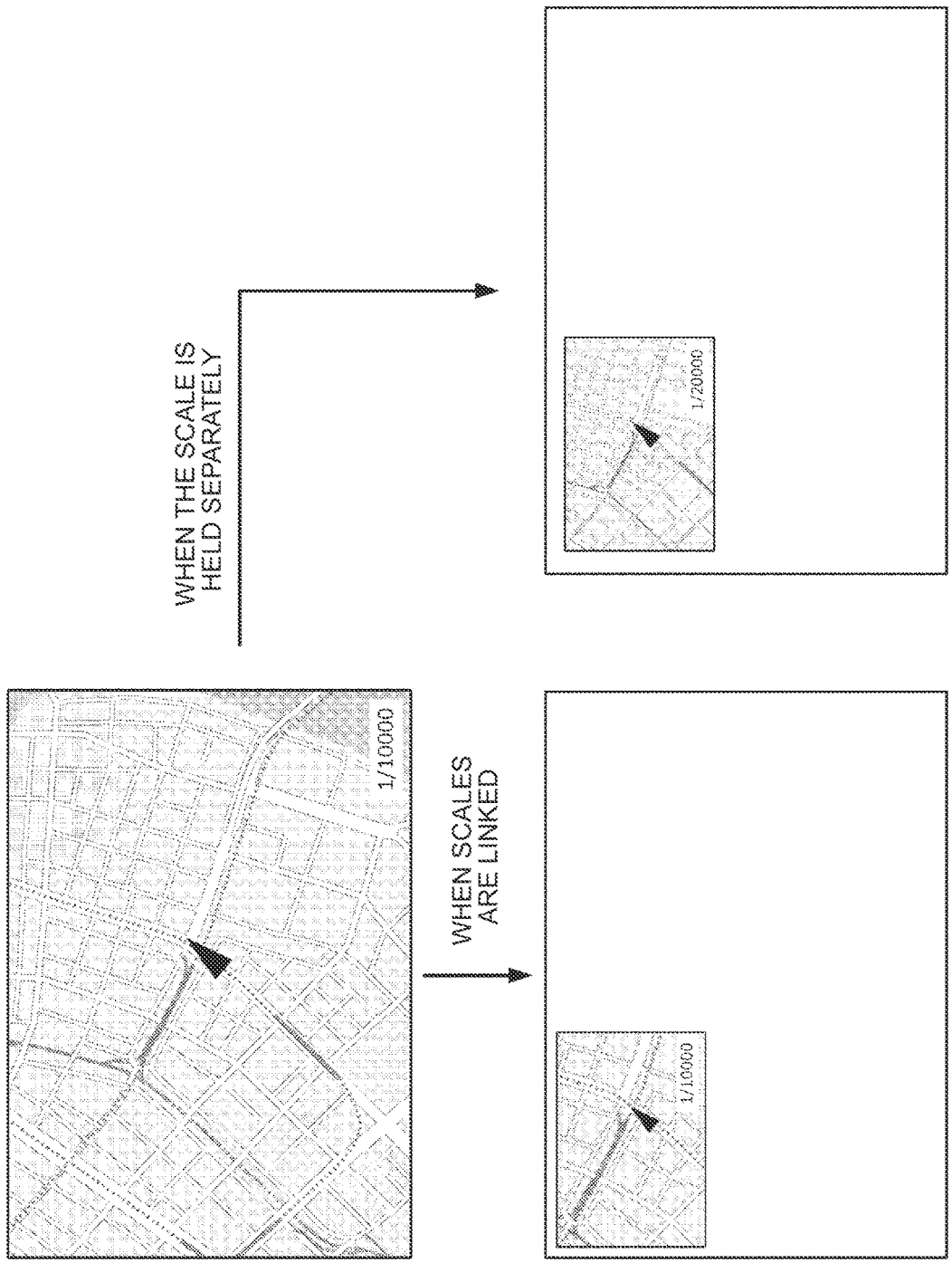

INFORMATION PROCESSING DEVICE

CROSS-REFERENCE TO RELATED APPLICATION

This application claims priority to Japanese Patent Application No. 2022-204493 filed on Dec. 21, 2022, incorporated herein by reference in its entirety.

BACKGROUND

1. Technical Field

The present disclosure relates to an information processing device.

2. Description of Related Art

In recent years, in-vehicle automotive navigation systems capable of displaying various types of information have appeared. In this regard, for example, Japanese Patent No. 7,044,933 (JP 7044933 B) discloses an in-vehicle terminal capable of displaying a plurality of contents in a widget format.

SUMMARY

An object of the present disclosure is to improve usability in a device that displays a map.

An aspect of an embodiment of the present disclosure is an information processing device that is configured to display a map by one of a first display arrangement and a second display arrangement regarding which an area of display on a screen of a display device differs from each other, and the information processing device includes a control unit that executes switching between the first display arrangement and the second display arrangement, based on a first operation performed by a user, and changing a scale of the map that is displayed, based on a second operation performed by the user.

When the second operation is performed while the map is displayed in the first display arrangement, the control unit changes the scale for when the map is displayed in the first display arrangement, and does not change the scale for when the map is displayed in the second display arrangement.

Examples of other aspects include a method executed by the information processing device, a program that causes a computer to execute the method, and a computer-readable storage medium non-transitorily storing the program.

According to the present disclosure, usability in a device for displaying a map can be improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 shows an example in which a road map is displayed according to a second display mode;

FIG. 4 is an example of setting data stored in a storage unit;

FIG. 5 shows an example of display when the display mode is switched;

DETAILED DESCRIPTION OF EMBODIMENTS

Figure 1:
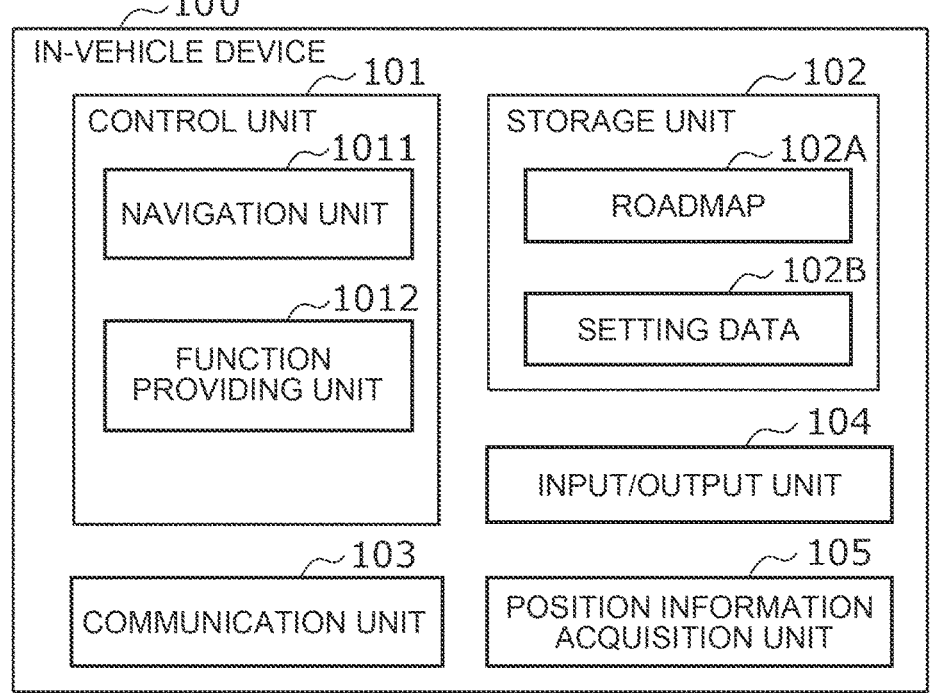
FIG. 1 is a schematic diagram of an in-vehicle device according to a first embodiment.

In recent years, an in-vehicle device (typically, a navigation device) capable of displaying various contents on a screen has appeared.

In the conventional navigation device, a full-screen display is a basic, and a form in which a road map screen, a television screen, an audio screen, and the like are switched and used is mainly.

However, in recent years, in-vehicle devices such as smartphones and personal computers, which can individually display individual applications through windows, have appeared. In such a device, for example, a floating window may cause a particular application to reside in the screen and another application to be displayed in the background.

However, when a road map is displayed in a window, there is a problem that the visibility of the road map changes according to the size of the window.

For example, the road map may be switched from a full-screen display to a window display. In this case, since the display area of the map decreases, the area displayed on the screen may be cut before and after the switching.

For example, it is conceivable that the road map is displayed on a full screen at a scale of $\frac{1}{10000}$, and the size of the window becomes ¼ before and after the switching. In this case, the area of the map visible to the occupant of the vehicle is also ¼. In other words, three quarters of the area of the map displayed so far is cut. As a result, the convenience may be deteriorated such that the positional relationship between the own vehicle and the destination is not known.

In order to solve this problem, it is preferable that the scale of the map be individually provided for each display arrangement, for example, "display the map on a scale of $\frac{1}{10000}$ in the case of full-screen display" or "display the map on a scale of $\frac{1}{20000}$ in the case of window display".

An information processing device according to the present disclosure solves this problem.

An information processing device according to an aspect of the present disclosure is an information processing device capable of displaying a map by any one of a first display arrangement and a second display arrangement in which a display area on a screen of the display device is different. Specifically, switching the first display arrangement and the second display arrangement based on the first operation performed by the user, and changing a scale of the map that is displayed based on a second operation performed by the user are executed by a control unit included in the information processing device.

The control unit, while displaying the map in the first display arrangement, when the second operation is performed, changes the scale when displaying the map in the first display arrangement, and the second display arrangement, characterized in that not changing the scale when displaying the map.

In the first display arrangement and the second display arrangement, the display area of the map on the screen of the display device is different from each other. For example, in a case where the first display arrangement is a form in which a map is displayed using a full-screen area (full-screen display), the second display arrangement may be a form in which a map is displayed using a partial area of the screen (window display).

The control unit can switch the first display arrangement and the second display arrangement at an arbitrary timing based on an operation (first operation) of the user.

In addition, the control unit can receive an operation (second operation) of changing the scale of the map.

However, in the case where the set value of the scale is interlocked between the first display arrangement and the second display arrangement, the above-described problem of deterioration in visibility may occur.

For example, it is conceivable that the first display arrangement is a form in which the map is displayed on the entire screen, and the second display arrangement is a form in which the map is displayed on a part of the screen in a window.

At this time, when the scale is set to $\frac{1}{10000}$ in the first display arrangement and the scale in the second display arrangement is also set to $\frac{1}{10000}$, the same range cannot be continuously displayed before and after the display arrangement is changed.

Therefore, when the scale change operation is performed while the map is being displayed in the first display arrangement, the control unit changes only the scale in the case where the map is displayed in the first display arrangement. That is, the scale setting corresponding to the first display arrangement and the scale setting corresponding to the second display arrangement are individually held, and when the scale change operation is performed, the control unit changes only the scale setting corresponding to the current display arrangement. When the display mode is switched from the first display arrangement to the second display arrangement, the control unit outputs the map by applying the scale setting corresponding to the second display arrangement.

As a result, it is possible to independently perform a scale change operation for each display arrangement.

The information processing device may include a storage unit that stores a first value that is a setting value of a scale applied when the map is displayed in the first display arrangement, and a second value that is a setting value of a scale applied when the map is displayed in the second display arrangement.

In this case, the control unit may update only the first value when the second operation is performed while displaying the map in the first display arrangement.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

An outline of the in-vehicle device according to the first embodiment will be described with reference to FIG. 1. The in-vehicle device 100 according to the present embodiment is a device that is mounted on the vehicle 10 and provides information to an occupant of the vehicle 10. The in-vehicle device 100 is also called a car navigation device, an infotainment device, or a head unit. The in-vehicle device 100 can provide navigation and amusement to the occupant of the vehicle.

The in-vehicle device 100 may have a function of performing wireless communication with an external network. The in-vehicle device 100 may have a function of downloading traffic information, road map data, music, moving images, and the like by communicating with an external network of the vehicle 10. In addition, the in-vehicle device 100 may be a device that can cooperate with a smartphone or the like.

The in-vehicle device 100 can be configured as a computer including a processor such as a CPU and a GPU, a main storage device such as a RAM and a ROM, and an auxiliary storage device such as a EPROM, a hard disk drive, and a removable medium. An operating system (OS), various programs, various tables, and the like are stored in the auxiliary storage device. The programs stored in the auxiliary storage device are executed such that various functions can be implemented that match the predetermined purpose, which will be described below. However, some or all of the functions may be implemented by a hardware circuit such as an ASIC or an FPGA.

The in-vehicle device 100 includes a control unit 101, a storage unit 102, a communication unit 103, an input/output unit 104, and a position information acquisition unit 105.

The control unit 101 is an arithmetic unit that realizes various functions of the in-vehicle device 100 by executing a predetermined program. The control unit 101 may be implemented by, for example, a CPU.

The control unit 101 includes two functional modules, a navigation unit 1011 and a function providing unit 1012. Each functional module may be implemented by execution of a stored program by the CPU.

The navigation unit 1011 provides a navigation function to an occupant of the vehicle 10. The navigation unit 1011 can render and output the road map based on the road map data stored in the storage unit 102, which will be described later. Further, acquired from the occupant of the vehicle 10, based on the destination information and the like, and generates a route of the vehicle 10 extending from the starting point to the destination, and has a function of guiding. The navigation unit 1011 provides the above-described functions by executing an application program having a function of displaying a road map and performing route guidance.

The function providing unit 1012 executes various functions other than navigation provided by the in-vehicle device 100. Functions provided by the in-vehicle device 100 include, for example, the following.

Terminal Link Function

This is a function of connecting to a terminal (a smartphone or the like) of an occupant of a vehicle, and performing reproduction of music or a moving image, mirroring of a screen, and the like.

Audio Functions

This is a function of reproducing a music piece stored in the storage device.

TV/Radio Function

This function receives radio broadcasting and digital television broadcasting.

These functions can be provided, for example, via the input/output unit 104 (typically, a touch panel display). Similarly to the navigation unit 1011, the function providing unit 1012 provides these functions by executing a corresponding application program.

The application program executed by the navigation unit 1011 can display the road map in a plurality of display modes. The plurality of display modes are modes in which the display area of the road map on the screen is different from each other.

Figure 2:
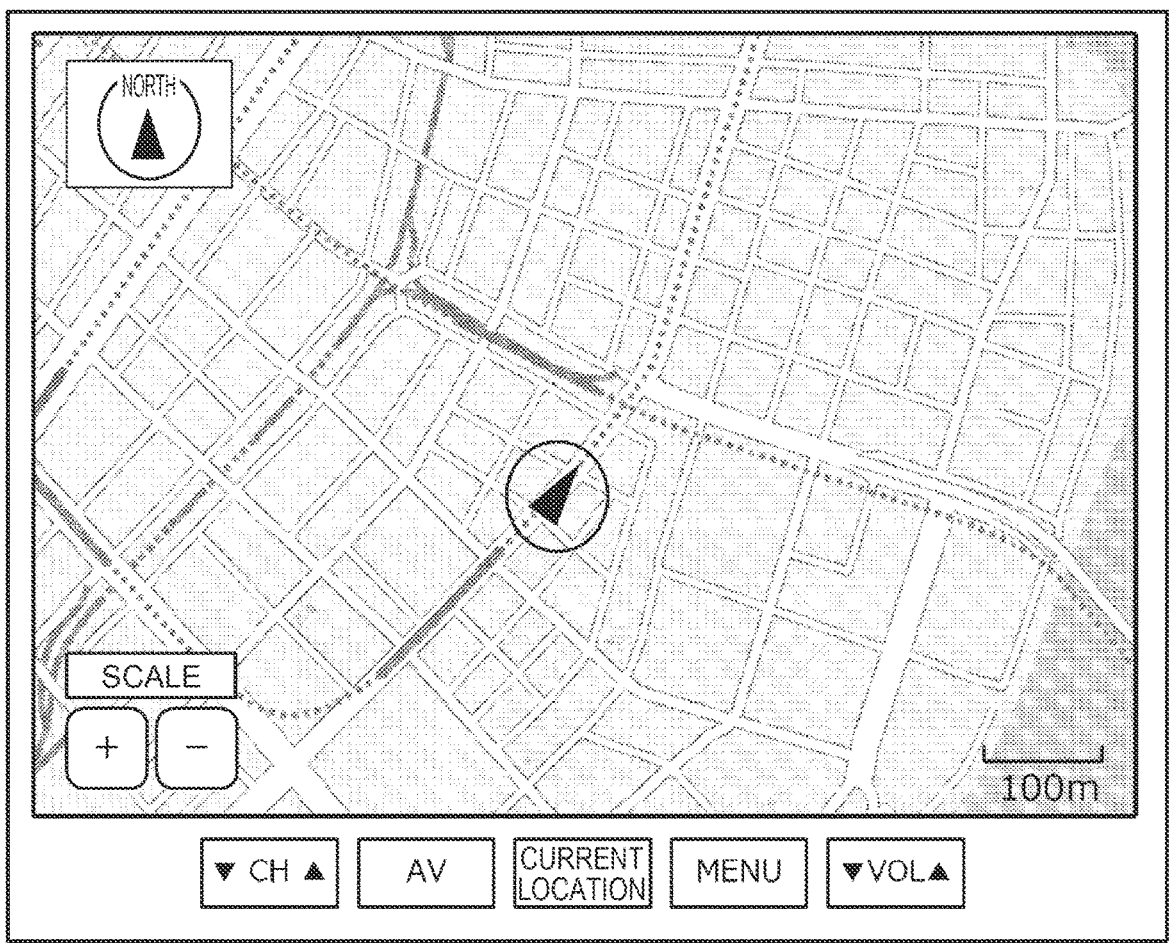
FIG. 2 is an example of a case where a road map is displayed according to the first display mode.

The first display mode (first display arrangement) is a mode (full screen mode) in which a road map is displayed on the entire surface of the display included in the in-vehicle device 100. FIG. 2 is an example of a case where a road map is displayed in the first display mode.

In the first display mode, a road map is displayed on the entire surface of the display included in the in-vehicle device 100.

The second display mode (second display arrangement) is a mode (window mode) in which a road map is displayed in a window. FIG. 3 is an example of a case where a road map is displayed in the second display mode. In the second display mode, the map is displayed in a floating window that can be resized to an arbitrary size and can be moved to an arbitrary coordinate. In the second display mode, the window can be moved, for example, by dragging inside the window. Further, the size of the window can be changed by dragging the border of the window.

Note that the navigation unit 1011 and the function providing unit 1012 can simultaneously execute a plurality of application programs.

In this case, a screen output by another application program that is executed simultaneously may be displayed in the background area (for example, the area indicated by reference numeral 301).

In order for the navigation unit 1011 to display a road map by a window of an arbitrary size, the following information is required.

Width of the window
Window height
Location information of the window (e.g., coordinates at the top left corner)

The navigation unit 1011 holds these pieces of information (hereinafter, referred to as window properties) for each display mode.

Further, the navigation unit 1011 individually holds the scale setting value of the road map for each display mode.

A specific data structure will be described later.

The storage unit 102 is means for storing information, and is composed of a storage medium such as a RAM, a magnetic disk, or a flash memory. The storage unit 102 stores various programs executed by the control unit 101, data used by the programs, and the like. Further, the storage unit 102 stores road-map data 102A and setting data 102B.

The road map data 102A is map data of a road on which the vehicle 10 can travel. The navigation unit 1011 renders images using the road map data 102A, thereby rendering the road map.

The setting data 102B is data that is used by the navigation unit 1011 and includes the window properties described above. FIG. 4 is an exemplary configuration 102B. The setting data 102B includes information identifying a display mode, a window property, and information regarding a scale setting. A window property is position information and size information of a window, and can be defined by horizontal width, vertical width, and coordinates of the upper left edge, as described above. When the display mode is full screen, the window property can be omitted.

The information on the scale setting is a numerical value representing the scale of the road map. For example, when the road map can be displayed by a plurality of scales, the setting value of the currently selected scale is stored. The scale setting may take a plurality of values, e.g., $1/5000$, $1/10000$, $1/20000$, etc. Note that the scale setting may be stepless.

The navigation unit 1011 determines the position and size of the road map by referring to the setting data 102B when the road map screen is newly generated. For example, when a road map is newly displayed in the full screen mode, the navigation unit 1011 acquires a record corresponding to the full screen mode from the setting data 102B, and draws the road map using the window property included in the record. When a new road map is displayed in the window mode, the navigation unit 1011 acquires a record corresponding to the window mode from the setting data 102B, and draws the road map using the window property included in the record.

The description will return to FIG. 1.

The communication unit 103 is a communication interface for connecting the in-vehicle device 100 to a bus of an in-vehicle network and an external device, respectively.

The communication unit 103 may include interfaces for performing Controller Area Network (CAN) communication in vehicles.

The communication unit 103 may include an antenna and a communication module for performing wireless communication with the outside. The antenna is an antenna element that inputs and outputs a wireless signal. In this embodiment, the antennae are adapted to mobile communications (e.g., mobile communications such as 3G, 4G, 5G). The communication module is a module for performing mobile communication.

The input/output unit 104 is means for receiving the input operation performed by the user and presenting information to the user. Specifically, the input/output unit 104 includes a touch panel, a control unit for the touch panel, a liquid crystal display, and a control unit for the liquid crystal display. The touch panel and the liquid crystal display are composed of one touch panel display in the present embodiment. The input/output unit 104 may include a unit (amplifier or speaker) for outputting the sound, a unit (microphone) for inputting the sound, etc.

The position information acquisition unit 105 acquires position information of the vehicle 10. The position information acquisition unit 105 includes GPS antennae and positioning modules for positioning the position information. The GPS antenna is an antenna that receives a positioning signal sent from a positioning satellite (also referred to as a global navigation satellite system (GNSS) satellite). The positioning module is a module that calculates the position information based on a signal received by the GPS antenna.

The position information acquired by the position information acquisition unit 105 is used by the navigation unit 1011 and the function providing unit 1012.

Next, the scale setting used by the navigation unit 1011 will be described. As described above, the in-vehicle device 100 according to the present embodiment can set the display mode of the application program being executed to either the full screen mode or the window mode at an arbitrary timing. FIG. 5 is diagram for explaining changes in the display when the road map is displayed in the full screen mode and when the road map is switched to the window mode.

For example, as shown in the upper left of FIG. 5, it is assumed that the roadway map is displayed in the full screen mode. Consider a case where the display mode is switched to the window mode in this state. When the scales are interlocked in both of the display modes, the surroundings of the host vehicle are cut off as shown in the lower left of FIG. 5. Before and after the change of the display mode, the scale is the same (for example, $1/10000$), but since the display range of the map is narrowed, the range displayed before the change may become invisible. In order to prevent this, it is preferable not to interlock the scales before and after changing the display mode.

Here, it is conceivable that the scale setting is individually held for each display mode. For example, it is assumed that in the full screen mode, the scale is set to 1/10000, and in the window mode, the scale is set to 1/20000. In this case, as shown in the lower right of FIG. 5, substantially the same area is continuously displayed before and after the display mode is changed.

In this way, by individually providing the scale setting for each display mode, the occupant of the vehicle can set the desired scale for each display mode. Accordingly, it is possible to prevent the occupant of the vehicle from feeling uncomfortable due to the change in the display area.

Figure 6:
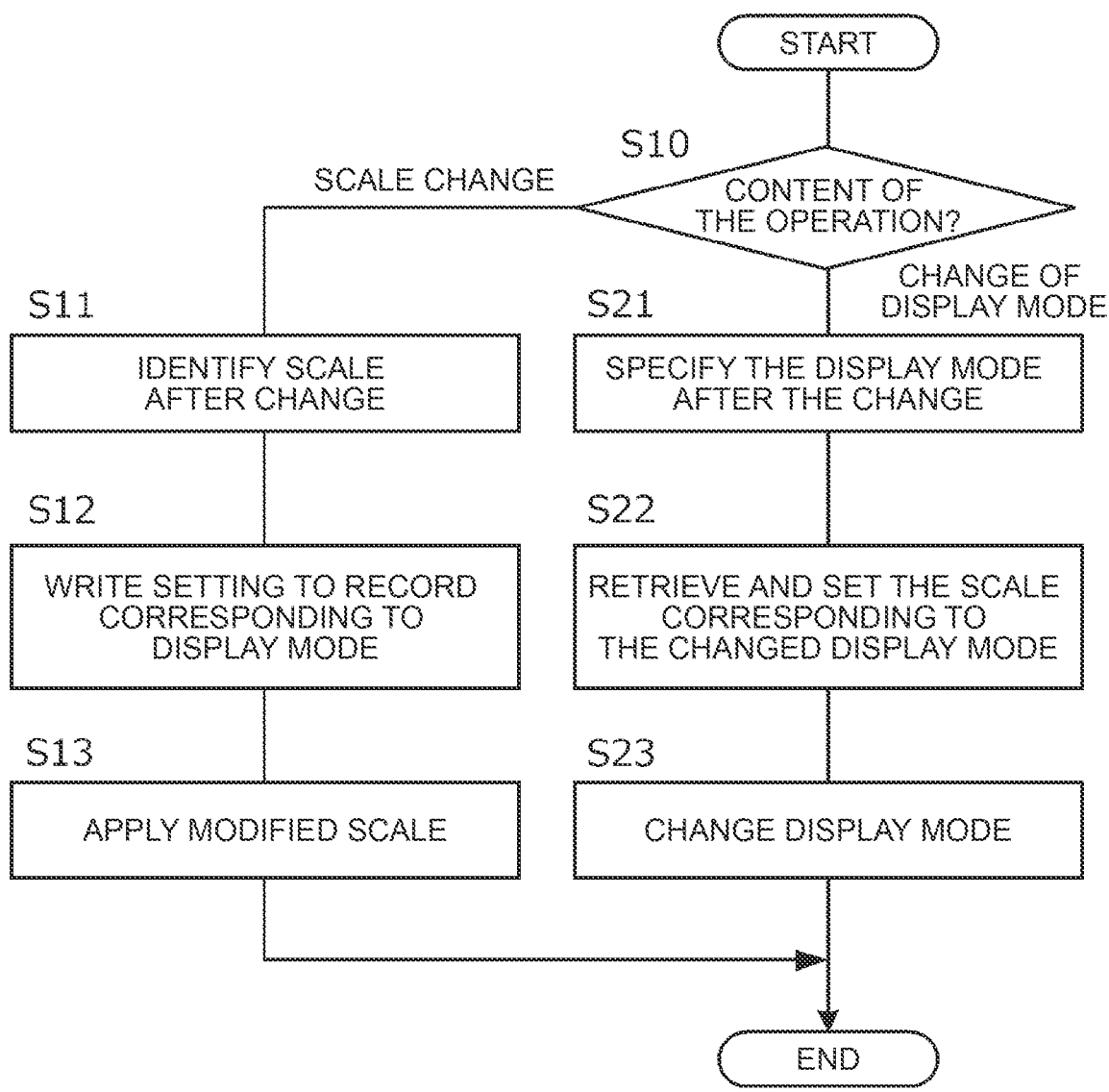
FIG. 6 is a flow chart of a process executed by in-vehicle device.

FIG. 6 is a flowchart of processing executed by the in-vehicle device 100 in the present embodiment. The illustrated processing is started by the navigation unit 1011 when the user (the occupant of the vehicle) performs an operation of changing the display mode or an operation of changing the scale of the map with respect to the in-vehicle device 100.

First, the content of the manipulation performed by the user is determined by S10. The operation is either "an operation of changing the scale of the road map" or "an operation of changing the display mode".

If the determined operation is an operation of changing the scale of the roadmap, the process transitions to S11.

In S11, the scale after the change is specified. For example, when the scale can be changed by a plurality of stages, the scale after the change can be specified based on the operation content (for example, the number of times of pressing of a button for changing the scale). In a case where the scale can be changed by a pinch operation or the like on the screen, the changed scale can be specified based on the manipulated variable.

Next, in S12, the scale setting field of the record corresponding to the present display mode among the records included in the setting data 102B is written with a value representing the changed scale. For example, when the current display mode is the full screen mode, a value representing the changed scale is written in the field indicated by reference numeral 401 in FIG. 4. In addition, when the current display mode is the window mode, a value representing the changed scale is written in the field indicated by reference numeral 402 in FIG. 4.

Next, in S13, the road map to which the changed scale is applied is rendered and outputted.

If the operation determined by S10 is an operation for changing the display-mode, the process transitions to S21.

In S21, the display mode after the change is specified. The display mode is either a full screen mode or a window mode. In S22, a scale corresponding to the changed display-mode is obtained. More specifically, a record corresponding to the changed display-mode is acquired from the setting data 102B, and the value stored in the scale setting field is acquired. Further, the acquired value is set to the scale of the road map.

Next, in S23, the display mode of the window is changed to the designated mode. In this step, the window setting is acquired from the record acquired by S22, and the position and size of the window are set in accordance with the setting.

As described above, the in-vehicle device according to the present embodiment is a device capable of displaying a road map by two display modes, i.e., a full-screen display and a window display, and has a feature that the scale setting values are individually held for each display mode. When the scale setting is interlocked between different display modes, the ease of viewing of the map may change due to a change in the display area. However, in the present embodiment, since the scale is individually held for each display mode, a sense of discomfort given to the user can be suppressed.

Modification of the First Embodiment

In the first embodiment, as the display mode of the road map, an arrangement in which display is performed by a full screen is exemplified as the first display arrangement, and as the second display arrangement, an arrangement in which display is performed by a floating window is exemplified, but the display arrangement is not limited to the exemplified one. For example, the first display arrangement may be a form in which display is performed by a full screen, and the second display arrangement may be a form in which display is performed by a floating window.

Further, for example, the in-vehicle device 100 may include a plurality of display modes such as a mode in which a screen is divided into upper, lower, left, and right, and a road map is displayed in a fixed region, and a mode in which a road map is displayed by a widget. Further, the display mode may be three or more types. In this case, the setting illustrated in FIG. 4 may be held for each display mode, and the setting may be read and applied according to the selected mode.

MODIFIED EXAMPLES

The above-described embodiments are merely examples, and the present disclosure may be appropriately modified and implemented without departing from the scope thereof. For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media includes any type of media suitable for storing, for example, magnetic disks (such as floppy (registered trademark) disks, hard disk drives (HDD)), optical disks (CD-ROM, DVD disk Blu-ray disks, etc.), Read Only Memory (ROM), Random Access Memory (RAM), EPROM, EEPROM, magnetic cards, flash memories, optical cards, electronic instructions.

What is claimed is:

1. An information processing device, comprising:
a display device;
a processor; and
a memory storing a first scale value, a second scale value, and window property including window width, window height, and coordinates of a map display area, and instructions which, in a case executed by the processor, cause the processor to display a map in either a first display arrangement or a second display arrangement, the first display arrangement and the second display arrangement having different areas on the display device;

switch the map between the first display arrangement and the second display arrangement in response to a first operation performed by a user;

display the map using the first scale value, the second scale value, and the window property in a case where the processor switches the map between the first display arrangement and the second display arrangement; and change only the first scale value applied in the first display arrangement, while maintaining the second scale value applied in the second display arrangement, in response to a second operation performed by the user while the map is displayed in the first display arrangement.

2. The information processing device according to claim 1, wherein each of the first display arrangement and the second display arrangement is either an arrangement in which the map is displayed on a full screen or an arrangement in which the map is displayed on a part of the screen in a window.

3. The information processing device according to claim 1, wherein the processor is configured to apply the second scale value in a case where the first operation of switching display arrangement of the map from the first display arrangement to the second display arrangement is performed.

4. The information processing device according to claim 1, wherein the processor is further configured to change the second scale value applied in the second display arrangement in response to the second operation while the map is displayed in the second display arrangement.

5. The information processing device according to claim 1, wherein the first display arrangement is a full-screen display of the map and the second display arrangement is a movable and resizable floating-window display of the map.

6. The information processing device according to claim 1, wherein the processor maintains the first scale value and the second scale value such that, in a case where switching from the first display arrangement to the second display arrangement is performed, an area of the map displayed after the switch overlaps at least 50% of the area displayed immediately before the switch.

7. The information processing device according to claim 1, further comprising a position-information acquisition unit configured to obtain a position of a vehicle, wherein the processor is further configured to superimpose a vehicle-position icon on the map in each display arrangement.

\* \* \* \* \*